US011459014B2

(12) United States Patent
Plebani et al.

(10) Patent No.: US 11,459,014 B2
(45) Date of Patent: Oct. 4, 2022

(54) ADJUSTMENT ASSEMBLY OF A HYDRAULIC STEERING SYSTEM OF A VEHICLE

(71) Applicant: SAME DEUTZ-FAHR ITALIA S.P.A., Treviglio (IT)

(72) Inventors: Alessandro Plebani, Treviglio (IT); Stefano Uberti, Treviglio (IT)

(73) Assignee: SAME DEUTZ-FAHR ITALIA S.P.A., Treviglio (IT)

( * ) Notice: Subject to any disclaimer, the term of this patent is extended or adjusted under 35 U.S.C. 154(b) by 256 days.

(21) Appl. No.: 16/650,888

(22) PCT Filed: Sep. 27, 2018

(86) PCT No.: PCT/IB2018/057507
§ 371 (c)(1),
(2) Date: Mar. 26, 2020

(87) PCT Pub. No.: WO2019/092516
PCT Pub. Date: May 16, 2019

(65) Prior Publication Data
US 2020/0269899 A1 Aug. 27, 2020

(30) Foreign Application Priority Data
Nov. 10, 2017 (IT) .................. 102017000128392

(51) Int. Cl.
*B62D 1/16* (2006.01)
*B62D 5/00* (2006.01)
(Continued)

(52) U.S. Cl.
CPC ............. *B62D 1/166* (2013.01); *B62D 1/181* (2013.01); *B62D 5/008* (2013.01); *B62D 5/093* (2013.01); *B62D 15/0215* (2013.01)

(58) Field of Classification Search
CPC ........ B62D 1/166; B62D 5/008; B62D 1/181; B62D 5/093; B62D 15/0215
See application file for complete search history.

(56) References Cited

U.S. PATENT DOCUMENTS 4,802,546 A * 2/1989 Sakikawa ................ B62D 5/06
180/440
5,285,867 A 2/1994 Baatrup et al.
(Continued)

FOREIGN PATENT DOCUMENTS

DE 4025697 A1 2/1992
EP 1584539 A2 10/2005
(Continued)

OTHER PUBLICATIONS

International Search Report and Written Opinion for International Patent Application No. PCT/IB2018/057507, dated Jan. 22, 2019. 12 pages.
(Continued)

*Primary Examiner* — Tony H Winner
*Assistant Examiner* — Michael R Stabley
(74) *Attorney, Agent, or Firm* — Armstrong Teasdale LLP (57) ABSTRACT

The adjustment assembly of a hydraulic steering system of a vehicle is provided. The adjustment assembly can be positioned between the steering column and the hydraulic steering unit of the system, to adjust the mutual angular position between the rotation angle of the steering column ($\alpha$) and the effective steering angle at the wheels ($\beta$). The adjustment assembly includes an adjustment device including an electric motor and an electronic command unit controlling its actuation; an epicycloidal device including a satellite-carrying member operatively connected to the steering column; at least one satellite gear supported and guided in rotation by the satellite-carrying member; a first solar gear operatively connected to the hydraulic steering unit and to (Continued)

the at least one satellite gear; and a second solar gear operatively connected to the adjustment device and to the first solar gear to control the angular position and/or the rotation of the first solar gear.

12 Claims, 8 Drawing Sheets

(51) Int. Cl.
  B62D 1/181 (2006.01)
  B62D 15/02 (2006.01)
  B62D 5/093 (2006.01)

(56) References Cited

U.S. PATENT DOCUMENTS

| | | | | |
|---|---|---|---|---|
| 5,423,391 | A * | 6/1995 | Shimizu | B62D 7/08 701/42 |
| 5,631,511 | A * | 5/1997 | Schulmann | F16H 1/32 310/78 |
| 7,247,111 | B2 * | 7/2007 | Yamanaka | B62D 6/003 475/2 |
| 7,479,089 | B2 * | 1/2009 | Yamanaka | F16H 57/12 475/344 |
| 7,568,989 | B2 * | 8/2009 | Naka | B62D 5/008 475/28 |
| 7,581,618 | B2 * | 9/2009 | Inaguma | B62D 5/008 180/444 |
| 7,604,560 | B2 * | 10/2009 | Shiotsu | F16H 13/06 180/443 |
| 7,665,572 | B2 * | 2/2010 | Yamanaka | B62D 5/008 180/443 |
| 7,678,004 | B2 * | 3/2010 | Yamanaka | B62D 5/008 475/339 |
| 8,046,133 | B2 * | 10/2011 | Akuta | B62D 6/002 701/42 |
| 9,114,823 | B2 * | 8/2015 | Hong | B62D 5/0409 |
| 9,334,928 | B2 * | 5/2016 | Ko | B62D 5/008 |
| 2005/0288143 | A1 * | 12/2005 | Menjak | B62D 5/008 475/29 |
| 2010/0084214 | A1 * | 4/2010 | Yamanaka | B62D 5/008 180/400 |

FOREIGN PATENT DOCUMENTS

WO  03066414 A1  8/2003
WO  2014178599 A1  11/2014

OTHER PUBLICATIONS

International Report on Patentability for International Patent Application No. PCT/IB2018/057507, dated Sep. 24, 2019. 15 pages.

* cited by examiner

ADJUSTMENT ASSEMBLY OF A HYDRAULIC STEERING SYSTEM OF A VEHICLE

CROSS-REFERENCE TO RELATED APPLICATIONS

This application is a National Phase filing of PCT International Application No. PCT/IB2018/057507, having an International Filing Date of Sep. 27, 2018, which claims the benefit of priority to Italian Patent Application No. 102017000128392, having a filing date of Nov. 10, 2017, each of which is hereby incorporated by reference in its entirety.

FIELD OF THE INVENTION

The present invention relates to an adjustment assembly of a hydraulic steering system of a vehicle. The present invention further relates to a hydraulic type steering system which comprises said adjustment assembly. The present invention also relates to the vehicle itself which comprises said adjustment assembly and/or said hydraulic type steering system; in particular, such vehicle is a tractor or, preferably, a compact tractor.

It is worth noting that the word "tractor" herein means both agricultural tractors and, more in general, large machines, such as the earth-moving machines, preferably derived from agricultural tractors or off-highway machines, i.e. in general specific machines for power operations, e.g. actions directly on the ground, such as tilling, or actions for loading and unloading material. On the other hand, "compact tractor" means the type of vehicle typically of small size, e.g. used in the vineyard sector, and then typically adapted to move in the space between two adjacent vine rows.

In other words, the context of specific application of the present invention is the automotive sector, with particular reference to vehicles in the agricultural and/or off-highway sector.

BACKGROUND OF THE INVENTION

Indeed, in presence of hydraulic steering systems, problems related to the mutual angular position between the rotation angle of the wheels and the rotation angle of the steering column assembly typically occur in such specific context.

In greater detail, we are referring to the possibility that the positioning between rotation angle of the steering column assembly (to which we shall refer hereinafter also as steering angle) and effective steering angle at the wheels may not appear to be unique in hydraulic type steering systems. In particular, the possibility of leakage from the hydraulic steering unit or inherent inaccuracies during operation as a result of which the effective steering angle of the wheels may not correspond to the steering column angle is not infrequent in hydraulic steering systems: indeed, such issue is typically found in tractors or compact tractors on which steering wheels of axial-symmetrical shape which is not suited to locate a definite starting position are typically fitted.

SUMMARY OF THE INVENTION

It is the object of the present invention to make an adjustment assembly which positioned between steering column and hydraulic steering unit is adapted to overcome such issue mentioned above typical of the background art.

Of fundamental relevance, in order to achieve such objective, is the need to be able to integrate the adjustment assembly with ease in a known hydraulic type steering systems and for it to be adapted in case of malfunctions (e.g. electric) to not affect the possibility for the driver to continue driving the vehicle, i.e. the tractor or the compact tractor.

Such object is achieved by the adjustment system having the features described below. At the same time, such object is achieved by a hydraulic type steering system which comprises the adjustment assembly described and claimed herein. Additionally, such object is achieved by the tractor or compact tractor also described below. Preferred embodiments are described as well.

BRIEF DESCRIPTION OF THE DRAWINGS

The features and advantages of the adjustment assembly according to the present invention will be apparent from the following description, given by way of non-limiting example, according to the accompanying figures, in which.

DETAILED DESCRIPTION

Figure 1:
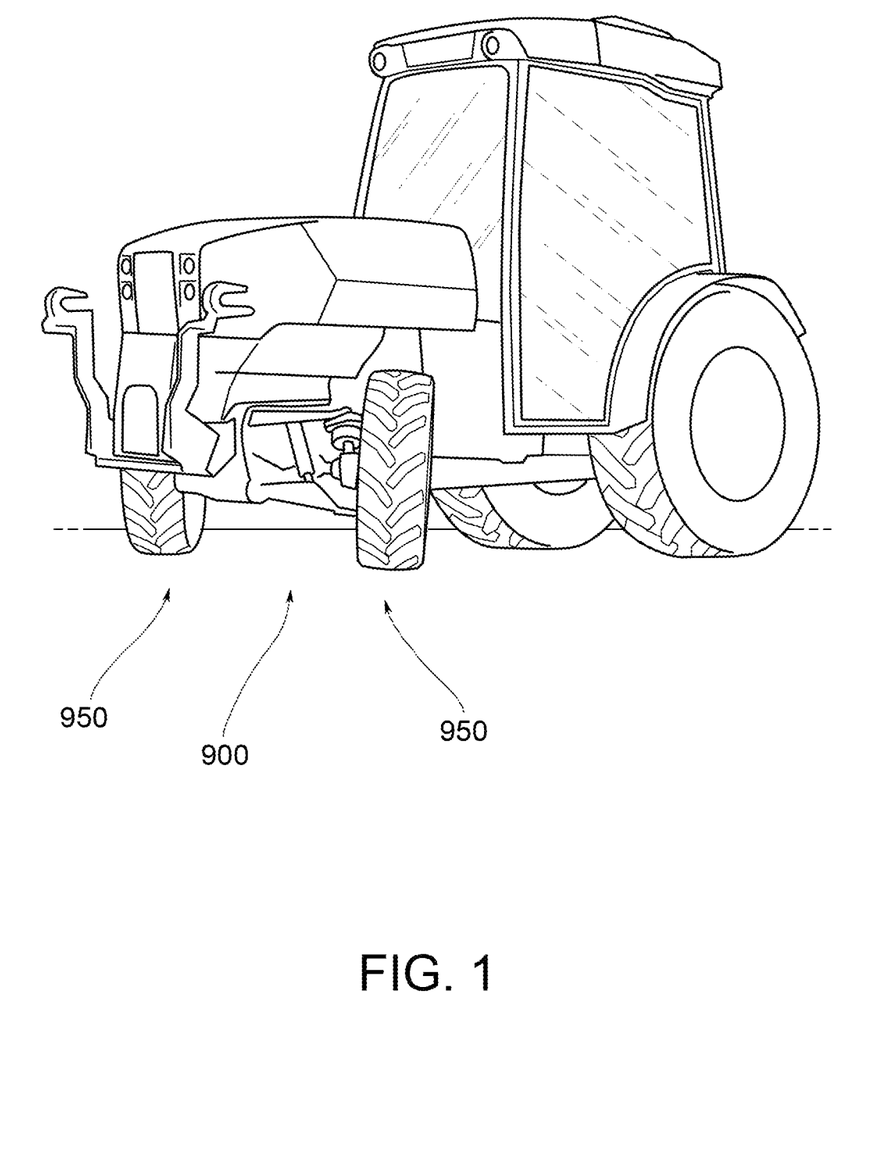
FIG. 1 shows a perspective view of a vehicle, in particular of a compact tractor, comprising a hydraulic steering system according to the present invention.
Figure 2:
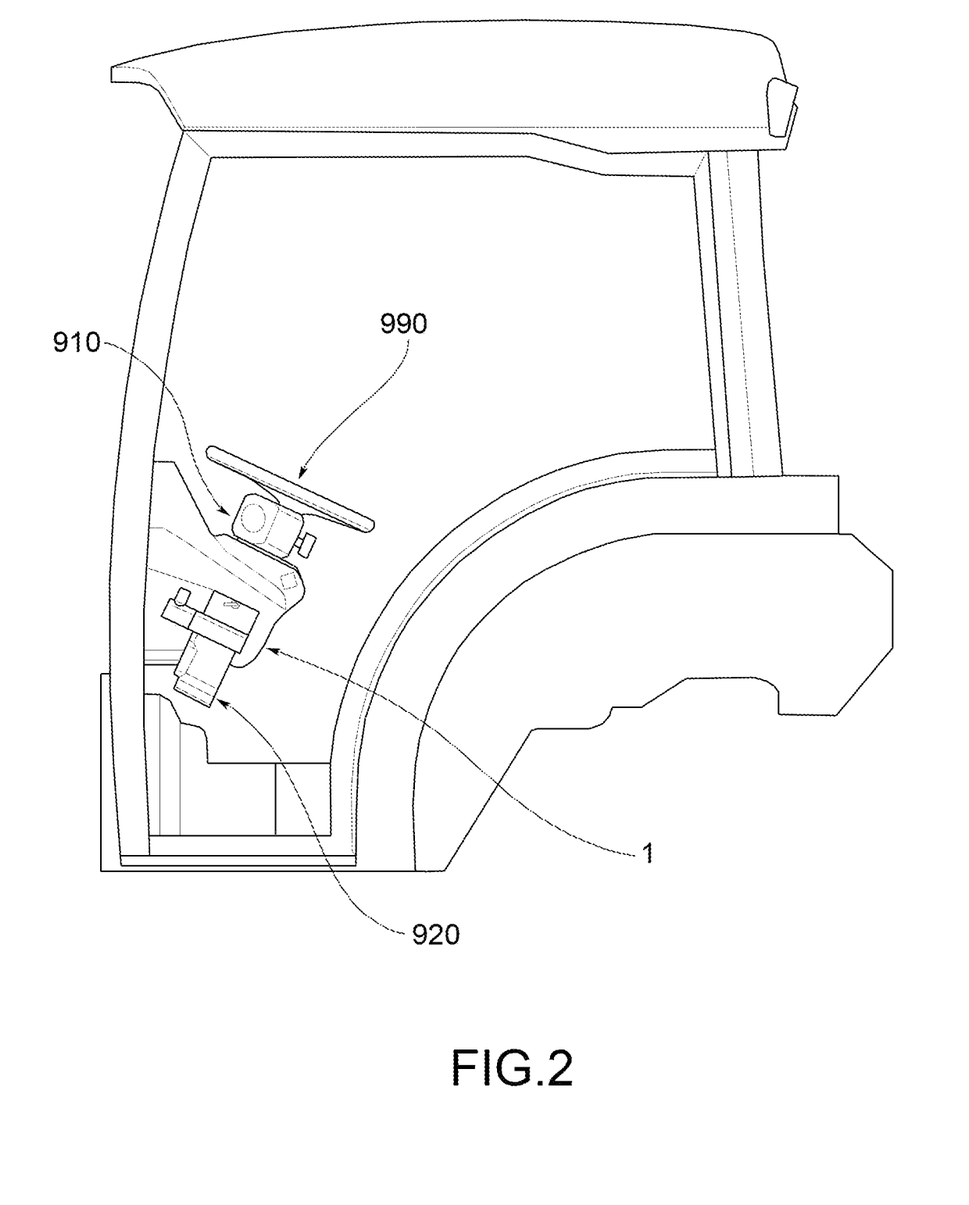
FIG. 2 shows the driving cab of the tractor in FIG. 1 in which the adjustment assembly which is the object of the present invention is housed.
Figure 3:
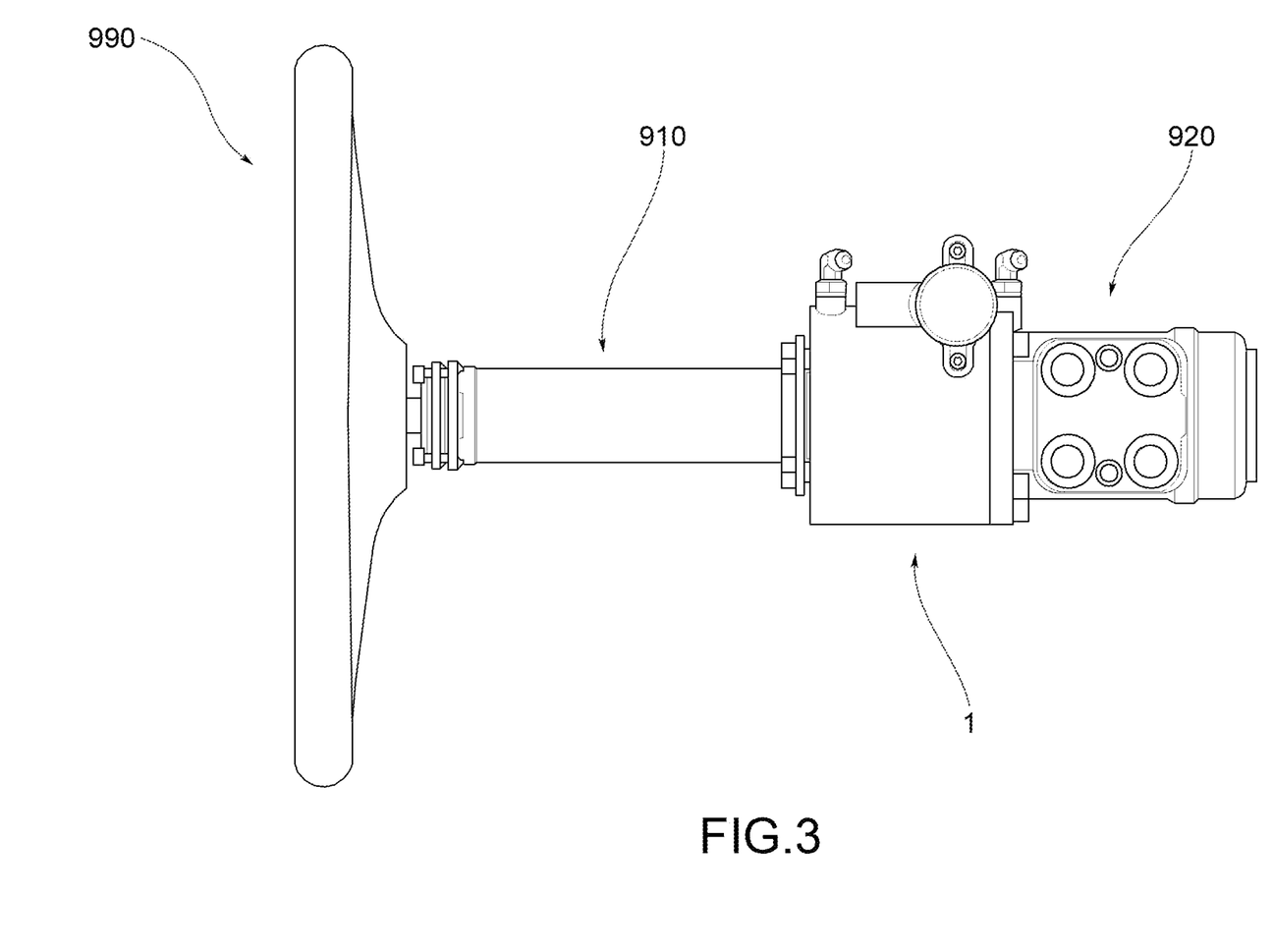
FIG. 3 shows a top view of a portion of the hydraulic steering system which is the object of the present invention.
Figure 4:
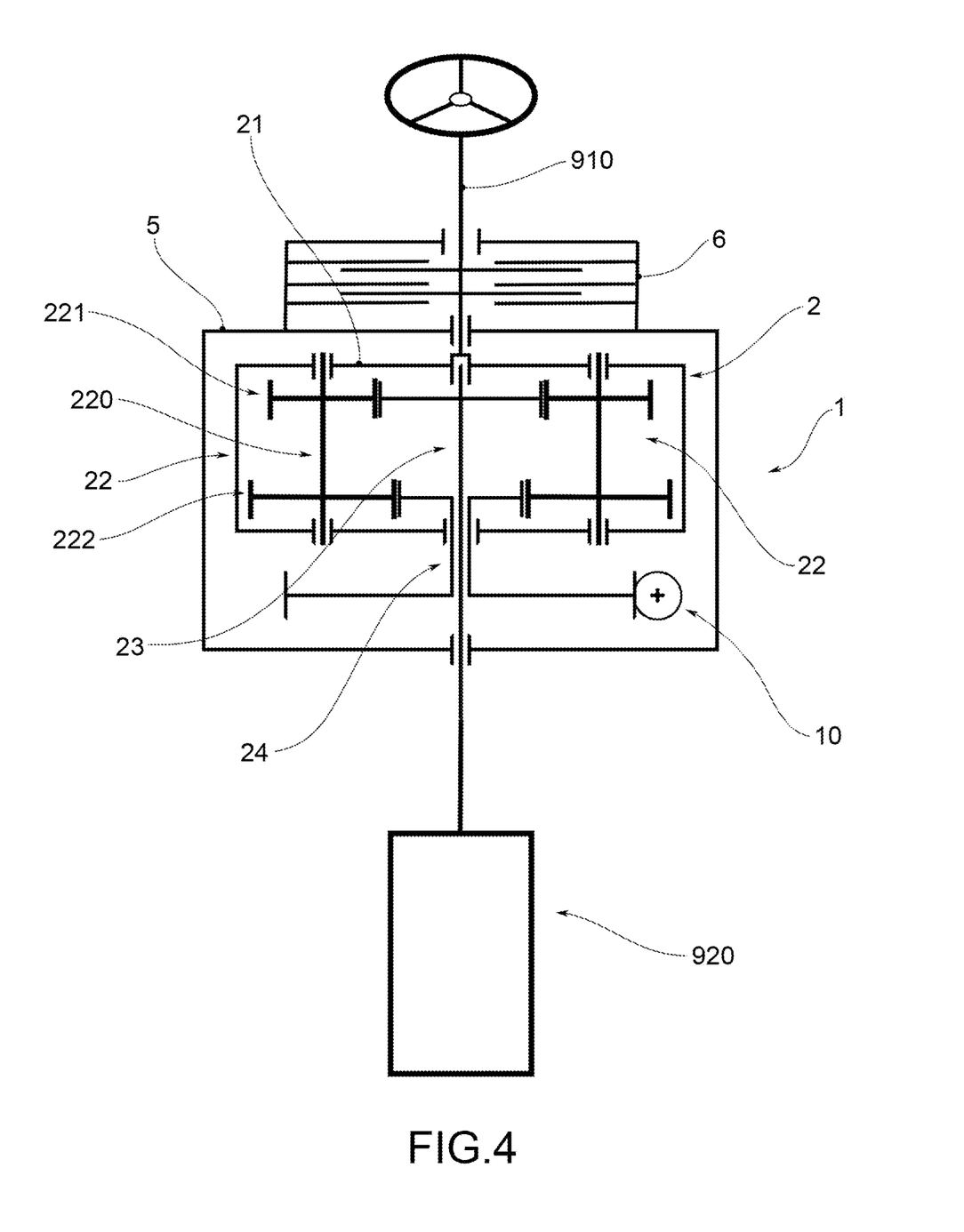
FIG. 4 shows a diagrammatic view of the portion of hydraulic steering system in FIG. 3.
Figure 5:
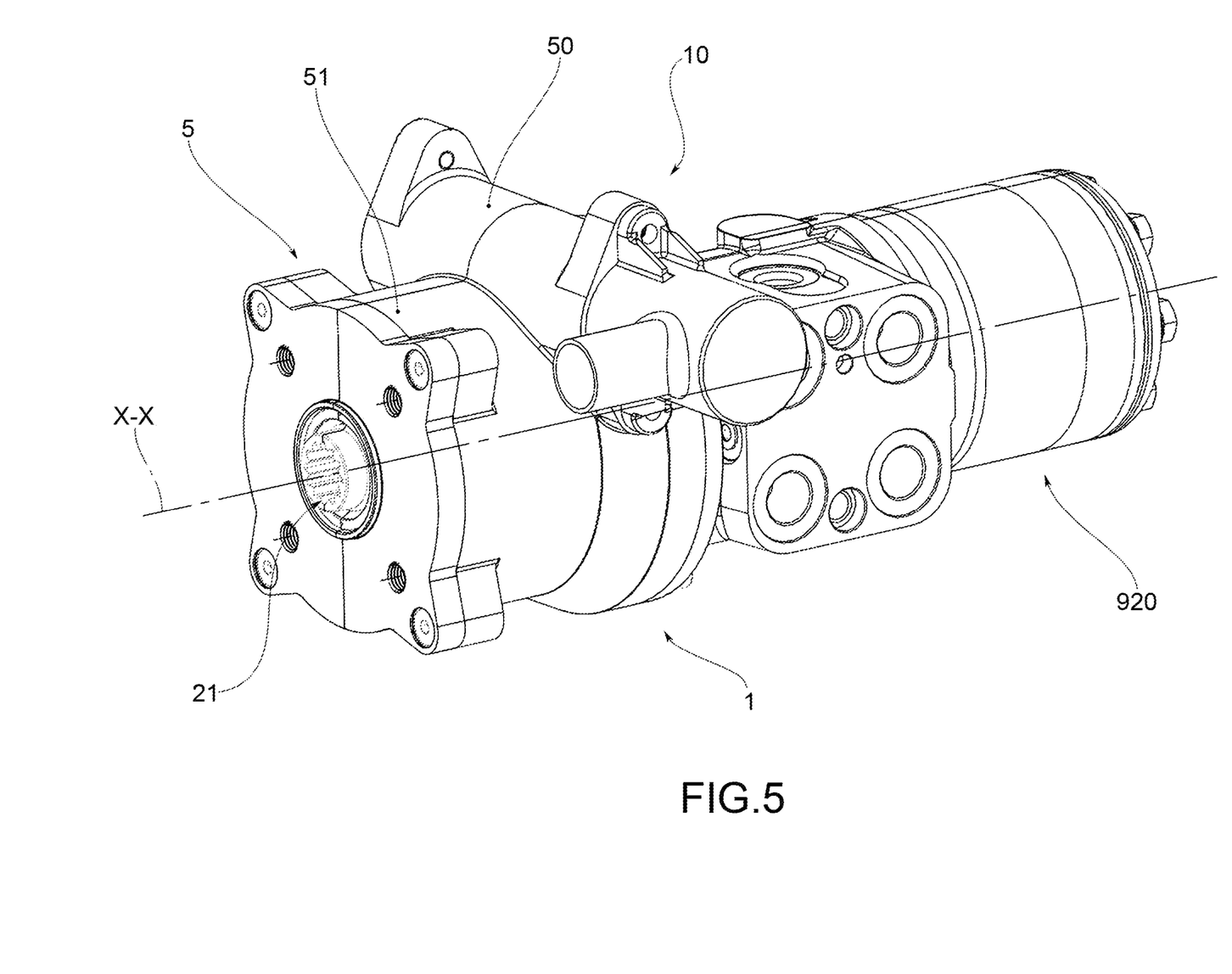
FIG. 5 shows a perspective view of the adjustment assembly according to the present invention on which a hydraulic steering unit is fitted.
Figure 6:
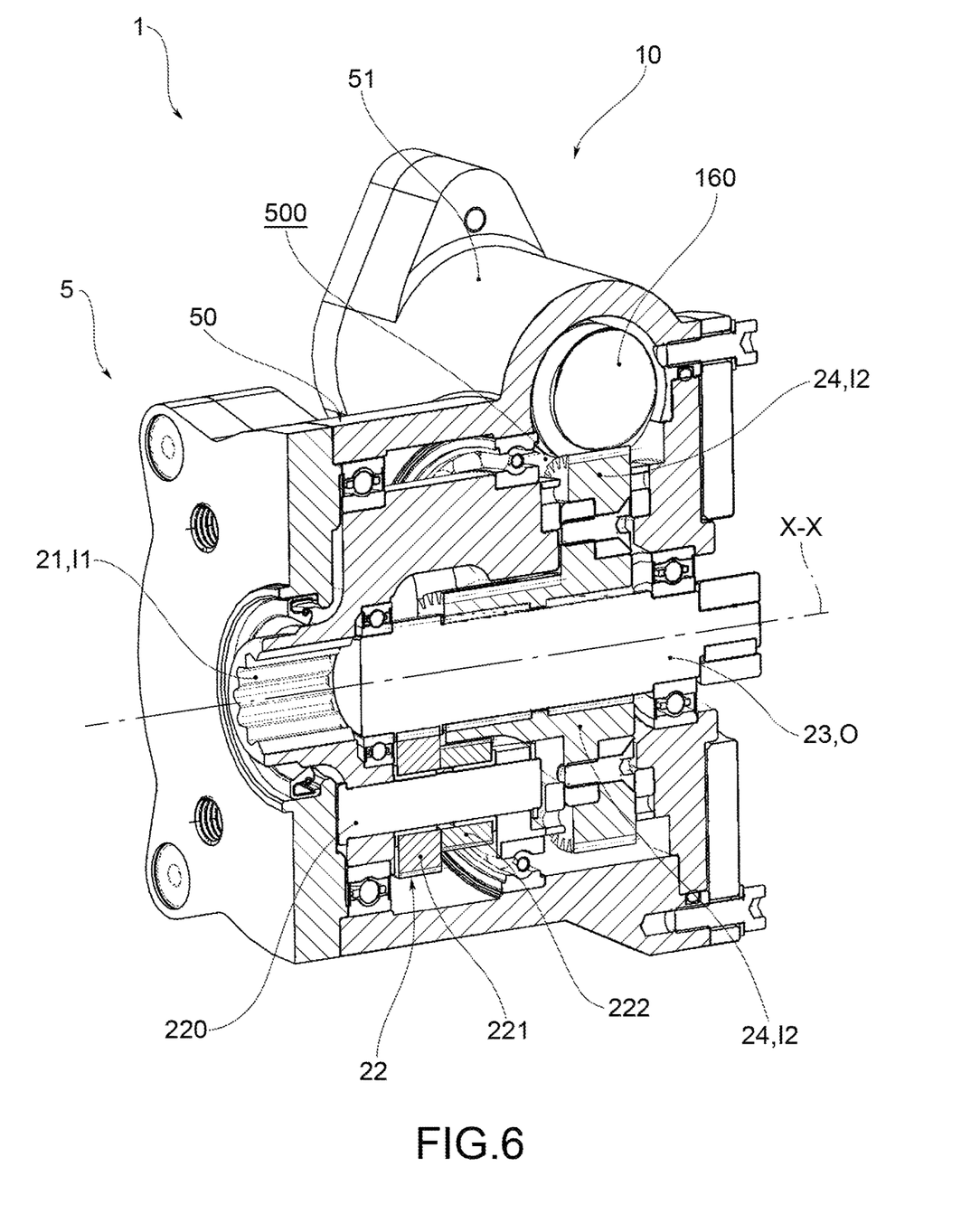
FIG. 6 shows a longitudinal section view of the adjustment assembly according to the present invention.
Figure 7:
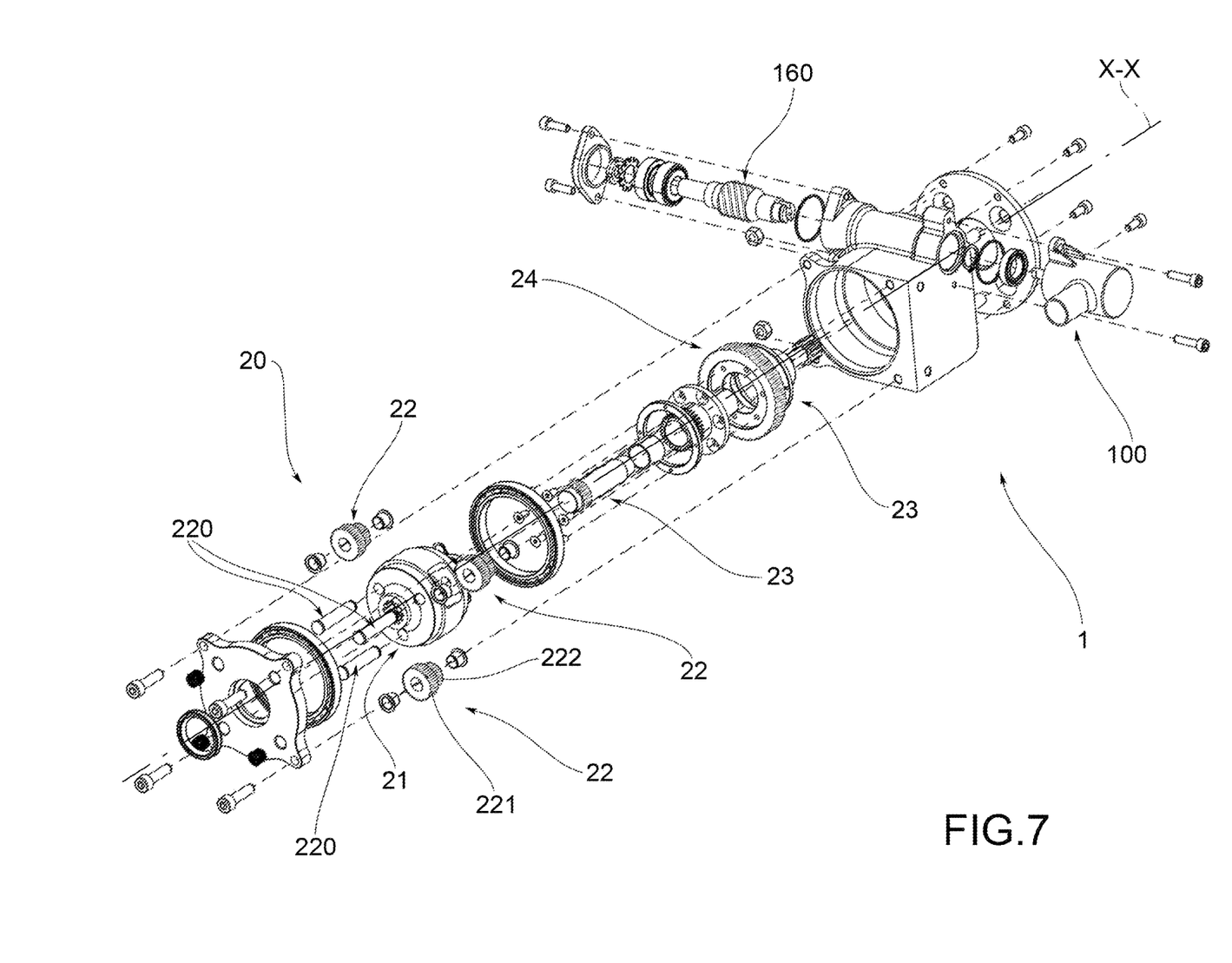
FIG. 7 shows a perspective view with parts separated of the adjustment assembly according to the present invention.
Figure 8:
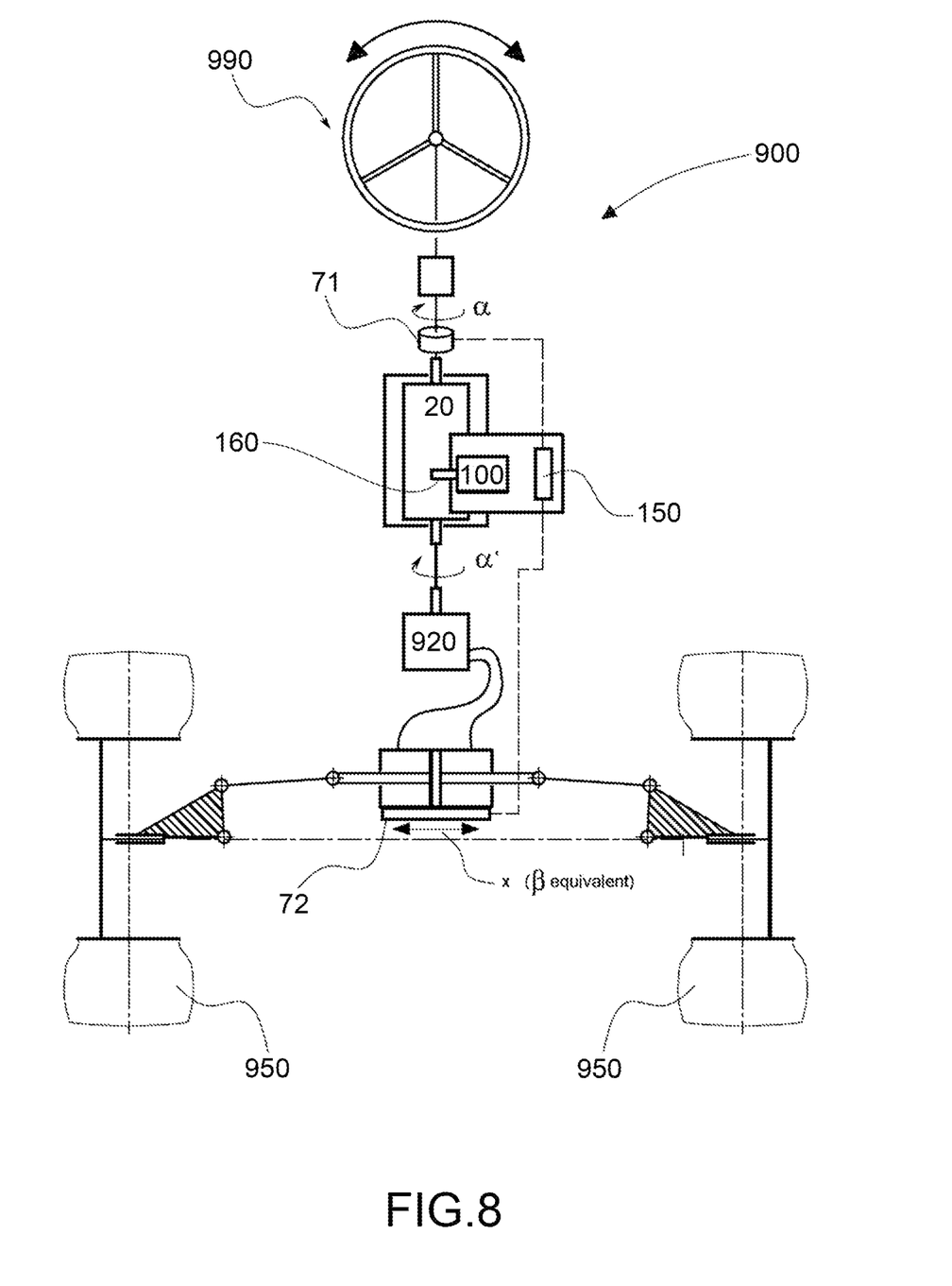
FIG. 8 shows a schematic view of an entire hydraulic steering system according to the present invention.

According to the accompanying figures, reference numeral 1 indicates an adjustment assembly of a hydraulic type steering system 900 of a vehicle as a whole.

According to a preferred embodiment, the vehicle which comprises said hydraulic type steering system 900 is a tractor.

According to a preferred embodiment, the vehicle which comprises said hydraulic type steering system 900 is a compact tractor.

According to a preferred embodiment, the hydraulic type steering system 900 comprises a steering column 910 and a hydraulic steering unit 920.

Preferably, operatively connected to the steering column 910, the vehicle comprises a steering wheel which is controllable by the driver of the vehicle. In other words, by means of the steering wheel, the driver of the vehicle performs a rotation which rotates the steering column.

According to a preferred embodiment, the hydraulic steering unit 920 is adapted to steer the wheels in a purely hydraulic manner. In other words, hydraulic steering unit 920 is a device which comprises a hydraulic orbital pump, the rotation of which is controlled by the driver and by his action on the steering column assembly 910 by means of the steering wheel and which is controlled by the adjustment assembly 1 as described in greater detail below. According to a preferred embodiment, the hydraulic steering unit 920 is connected to the steering wheel assemblies by means of specific linkages, e.g. comprising an appropriate hydraulic piston.

It is worth noting that the object of the present invention is not limited to the features of the hydraulic steering unit 920, to the features of the steering linkages or to the features of the wheel assemblies in any manner.

According to the present invention, the adjustment assembly 1 is interposed between the steering column 910 and the hydraulic steering unit 920. According to some preferred embodiments, and as shown in some of the appended figures, the adjustment assembly 1 is mounted directly on the hydraulic steering unit 920.

As already mentioned, it is the main object of the present invention to have an adjustment assembly 1 which is adapted to adjust the mutual angular position between the rotation angle of the steering column assembly α and the effective steering angle at the wheels β.

Indeed, the adjustment assembly 1 is adapted to adjust the rotation angle of the steering column assembly α and the effective steering angle at the wheels β in a biunivocal position. In this manner, the starting angular position of the steering wheel is preferably guaranteed independently from hydraulic leakages of the hydraulic steering unit. According to a preferred embodiment of adjustment, the adjustment between the rotation angle of the steering column assembly α and the effective steering angle at the wheels β is biunivocal, e.g. by performing a multiplying action or a reducing action.

To achieve such object, the adjustment assembly 1 which is object of the present invention comprises two main devices operatively connected to each other: an adjustment device 10 and an epicycloidal device 20.

Said adjustment device 10, described below in greater detail, comprises an electric motor 100 and an electronic command unit 150 which controls the actuation of said electric motor 100.

According to a preferred embodiment, the epicycloidal device 20 is substantially a combined type epicycloidal device; preferably the epicycloidal device 20 is of the "bridge" type.

According to a preferred embodiment, the input of the epicycloidal device 20 is operatively connected to the steering column assembly 910, while the output is connected to the hydraulic steering unit 920.

According to the present invention, the steering column 910 delivers a first input to the input of the epicycloidal device 20.

Additionally, according to the present invention, the adjustment device 10 delivers a second input to the input of the epicycloidal device 20.

Indeed, the epicycloidal device 20 comprises a satellite-carrying member 21 which acts as the first input I1, being operatively connectable to the steering column 910. Preferably, said satellite-carrying member 21 is also named planetary carrier set.

Furthermore, the epicycloidal device 20 comprises at least one satellite gear 22 supported and guided in rotation by the satellite-carrying member 21.

Preferably, each satellite gear 22 is fixed to the satellite-carrying member 21 so as to follow an orbital movement induced by the rotation of the satellite-carrying member 21 induced by the steering column 910.

Preferably, each satellite gear is connected to said satellite-carrying member 21 by means of a rotation shaft 220 on which it is mounted in rotationally free manner.

According to the present invention, the adjustment device 20 comprises a first solar gear 23 and a second solar gear 24.

Said first solar gear 23 serves as output O being operatively connectable to the hydraulic steering unit 920. Said first solar gear 23 is operatively connected to the at least one satellite gear 22.

Said second solar gear 24 acts as second input 12 and is operatively connected to the adjustment device 10 and to the first solar gear 23 so as to control the angular position and/or the rotation of the first solar gear 23, and therefore of the output O.

In other words, the first solar gear 23 is controllable in rotation by the satellite-carrying member 21 by means of the at least one satellite gear 22, and so is controllable in rotation by the steering column 910 and thus by the driver of the vehicle. Furthermore, the first solar gear 23 is controllable in rotation by the second solar gear 24 and so is controllable in rotation by the adjustment device 10. In other words, the first solar gear 23 is controllable in rotation both by the action of the steering column 910 and by the action of the adjustment device 10; the obtainable output is the combination of the two input. If one of the two input is zero, the output is therefore a direct consequence of only supplied input.

In detail, preferably, the second solar gear 24 is operatively connected to the first solar gear 23 by means of the at least one satellite gear 22.

According to a preferred embodiment, each satellite gear 22 comprises a first toothing 221 and a second toothing 222. Preferably, the first toothing 221 is geared with the first solar gear 23, wherein the second toothing 222 is geared with the second solar gear 24.

According to a preferred embodiment, each satellite gear 22 comprises two distinct annular components: the first comprising the first toothing 221 and the second comprising the second toothing 222. Said two separate components are mutually joined in solid integral manner so as to always rotate at the same time.

According to a further preferred embodiment, each satellite gear 22 consists of a single body.

According to a preferred embodiment, the reduction unit 20 has the main development along a main axis X-X.

Preferably, the satellite-carrying member rotates concentrically with respect to said main axis X-X. At the same time the satellite gears have an orbital movement which is concentric with respect to said main axis X-X. Preferably, each satellite gear 22 is arranged on the satellite-carrying member 21 in a distal position with respect to said axis X-X.

Preferably, the axis of the rotation shaft 220 is parallel to the main axis X-X.

As shown in the appended figures, according to a preferred embodiment, the steering column 910 is operatively connected to the satellite-carrying member 21 at the main axis X-X.

According to a preferred embodiment, the first solar gear 23 is arranged parallel to the main axis X-X, preferably concentric therewith.

According to a preferred embodiment, the second solar gear 24 is arranged parallel to the main axis X-X, preferably concentric therewith.

Preferably, the first solar gear 23 and the second solar gear 24 are mutually parallel and concentric with respect to the main axis X-X.

According to a preferred embodiment, the epicycloidal device 20 comprises a plurality of satellite gears 22, preferably 3 or 4, angularly equidistant from one another.

According to a preferred embodiment, the adjustment device 10 comprises a worm screw element 160 driven in rotation by the electric motor 100 and operatively connected to the second solar gear 23. Preferably, the worm screw 160 is geared by means of appropriate gears to the second solar gear 23.

Preferably, the rotary action of the worm screw element 160 is controlled by the electric motor 100 controlled of the electronic command unit 150. In other words, the rotation of the worm screw 160 is controlled as a function of the rotation angle of the steering column assembly α and of the effective steering angle at the wheels β. In other words, depending on what detected, the electronic command unit 150 is adapted to control the actuation of the electric motor 100, whereby causing the rotation of the worm screw 160, thus changing the effective steering angle at the wheels β. In other words, in absolute terms, the effective steering angle at the wheels β univocally corresponds to a rotation angle of the steering column assembly α.

So, by virtue of the rotation of the worm screw 160, any hydraulic leakages of the steering unit 920 and any angular misalignments between steering column and effective steering angle at the wheels are recovered. In other words, the worm screw 160 with its rotation is such as to possibly induce a rotation of the first solar gear 23.

According to a preferred embodiment, the adjustment device 10 is also adapted to amplify the steering ratio. In particular, by acting on the rotation speed of the electric motor 100 by means of the electronic command unit 150, it is thus possible to make the steering more or less direct, by varying the relationship between the rotation of the steering wheel and rotation of the wheel assemblies. Such operating feature is particularly appreciated particularly on compact tractors which are typically called to work in particularly difficult conditions, which for example require wide steering angles and reactivity (as in the maneuvers between multiple vines rows).

According to a preferred embodiment, the adjustment assembly 1 further comprises a brake group 6 adapted to be operatively connected to the steering column 910, e.g. operatively connected to the satellite-carrying member 21 adapted to perform the mechanical end stop action for the rotation induced by the driver.

In other words, in a preferred embodiment, a signal preferably of mechanical type is sent by means of the brake assembly 6 to the driver of the end stop to suggest him or her to either stop turning or lock the steering wheel. According to a preferred embodiment, the brake assembly 6 is adapted to lock the rotation of the steering column assembly 910, e.g. by operating directly on the satellite-carrying member 21. Preferably, the brake assembly 6 is adapted to mechanically either brake or lock the rotation of the steering column assembly 910 and/or of the satellite-carrying member 21.

Furthermore, according to a preferred embodiment, the adjustment assembly 1 comprises a housing body 5 comprising a first casing 51, which contains the epicycloidal device 20, and a second casing 50, which contains the adjustment device 10. Preferably, the two casings 50, 51 are mutually connected to allow the operative connection between the adjustment device 10 and the second solar gear 24. In other words, a passage opening 500 is located between the two casings through which the worm screw 160 is adapted to operatively engage the second solar gear 23.

Preferably, the brake assembly 6 is also housed inside the housing body 5.

It is a further object of the present invention a hydraulic steering system of a vehicle 900, comprising a steering column 910 which is connectable to a steering wheel 990 controllable by the driver of the vehicle, a hydraulic steering unit 920 operatively connected to the steering wheels 950 of the vehicle to steer them and an adjustment assembly 1 as described above.

Said hydraulic system further comprises detection devices comprising a first sensor 71 adapted to detect the rotation angle α of the steering column 910 and a second sensor 72 adapted to detect the effective steering angle wheel β.

Preferably, said detection devices are connected to the electronic command unit 150 so as to control the actuation of the electric motor 100 as a function of that detected by the first sensor 71 and the second sensor 72.

As mentioned, it is the further object of the present invention a tractor or a compact tractor comprising a hydraulic steering system 900 as described.

It is a further object of the present invention a tractor or a compact tractor comprising a driving cab in which the driver is accommodated, wherein said adjustment assembly is adapted to be housed in said driving cab.

Innovatively, the adjustment assembly of a hydraulic steering system makes it possible to achieve the object of the invention, i.e. to provide an adjustment assembly which positioned between steering column and hydraulic steering unit is adapted overcome the typical problems of the background art.

Advantageously, the need for the adjustment assembly to be integrable with ease in a hydraulic steering system of the known type was considered in achieving the object. Advantageously, the adjustment assembly is modular and simple to fit in steering hydraulic systems of type known. Advantageously, in the operation of inserting an adjustment assembly in a known hydraulic type steering system, it is not necessary to vary the hydraulic components of the latter, whereby allowing quick and simple fitting operations of the adjustment assembly.

Furthermore, advantageously, in the case of malfunctions, the adjustment assembly does not affect the driver's possibility to continue controlling the vehicle.

Advantageously, if the electric motor malfunctions, the steering column, satellite-carrying member, satellite gear, first solar gear, hydraulic steering unit kinematic chain is free to continue the rotation.

Advantageously, in a preferred embodiment of the present invention, the reduction device has a transmission ratio equal to −1. Advantageously, even in case of malfunction of the electric motor, the transmission ratio remains unchanged. Advantageously, in the case of electric malfunction, the steering mode remain unchanged. So, advantageously, the electric motor is only used in case of need, whereby limiting its malfunctions due to a high use. Advantageously, as mentioned, the operations of inserting an adjustment assembly in a known hydraulic type steering system do not require the replacement of any hydraulic components already present on the vehicle.

Advantageously, the adjustment device is adapted to intervene also as steering ratio amplifier, so as to ensure greater reactivity and steering angles to the tractor. Advantageously, compact tractors can benefit from these features so as to have a particularly direct and reactive steering, which is perfect, for example, for move between vine rows.

Advantageously, by means of the adjustment assembly, the possibility of continuously controlling the rotation angle of the steering column and the effective steering angle at the wheels is guaranteed. Advantageously, a unique starting point is identified and all deviations associated to the hydraulic steering system of the hydraulic type are corrected.

Advantageously, tractors or compact tractors comprising the adjustment assembly can fit a steering wheel of ergonomic type and/or shaped and/or fitted with specific electronics, visual interface and/or the control panel.

Advantageously, the adjustment assembly is very compact.

Advantageously, by virtue of the fact that adjustment device operates on the satellite gears of the reduction device supported by the satellite-carrying member the radial dimensions of the adjustment assembly are not increased.

Advantageously it is also possible to implement a satellite type steering on the vehicle in which the brake assembly inhibits the movement of the steering wheel and column, while the steering is controlled by the electric motor.

Advantageously, the adjustment assembly is housable in the driving cab of a tractor or compact tractor.

It is apparent that a person skilled in the art can made changes to the adjustment system for a steering system of hydraulic type, to the tractor or compact tractor described above, all of which are contained within the scope of protection as described and claimed herein.

The invention claimed is:

1. An adjustment assembly of a hydraulic steering system of a vehicle, wherein the adjustment assembly is positionable between a steering column and a hydraulic steering unit of the hydraulic steering system, wherein the adjustment assembly is suitable to adjust a mutual angular position between a rotation angle of the steering column ($\alpha$) and an effective steering angle of wheels ($\beta$), wherein the adjustment assembly comprises:
an adjustment device comprising an electric motor and an electronic command unit commanding actuation of the electric motor; and
an epicycloidal device comprising:
i) a satellite-carrying member which acts as a first input being operatively connectable to the steering column;
ii) at least one satellite gear supported and guided in rotation by the satellite-carrying member by means of a rotation shaft on which it is freely rotatably mounted;
iii) a first solar gear which acts as an output being operatively connectable to the hydraulic steering unit, wherein the first solar gear is operatively connected to the at least one satellite gear; and
iv) a second solar gear which acts as a second input and is operatively connected to the adjustment device and to the first solar gear, through the at least one satellite gear, in such a way as to command angular position and rotation of the first solar gear, and the output;
wherein the at least one satellite gear has a first toothing and a second toothing, wherein the first toothing is geared with the first solar gear, wherein the second toothing is geared with the second solar gear.

2. The adjustment assembly of claim 1, wherein the epicycloidal device comprises a main axis (X-X) wherein the satellite-carrying member rotates concentrically with respect to the main axis (X-X).

3. The adjustment assembly of claim 2, wherein the at least one satellite is housed on the satellite-carrying member in a distal position from the main axis (X-X).

4. The adjustment assembly of claim 1, wherein the at least one satellite gear comprises a plurality of satellite gears angularly equidistant from each other.

5. The adjustment assembly of claim 1, wherein the epicycloidal device comprises a main axis (X-X) wherein the first solar gear and the second solar gear are arranged in parallel and concentric with respect to the main axis (X-X).

6. The adjustment assembly of claim 1, wherein the adjustment device comprises a worm screw element driven in rotation by the electric motor and operatively connected to the second solar gear.

7. The adjustment assembly of claim 1, further comprising a brake group suitable to be operatively connected to the steering column and to the satellite-carrying member to perform a mechanical end stop action or a safety lock action of the rotation induced by a driver of the vehicle.

8. The adjustment assembly of claim 1, further comprising a housing body comprising a first casing containing the epicycloidal device and a second casing containing the adjustment device, wherein the first casing and the second casing are mutually connected to allow operative connection between the adjustment device and the second solar gear.

9. A hydraulic steering system of a vehicle, comprising:
a steering column connectable to a steering wheel commandable by a driver of the vehicle;
a hydraulic steering unit operatively connected to steering wheels of the vehicle to command them in steering; and
the adjustment assembly of claim 1 positioned between the steering column and the hydraulic steering unit, wherein the adjustment assembly is suitable to adjust a mutual angular position between a rotation angle of the steering column ($\alpha$) and an effective steering angle of the wheels ($\beta$).

10. The hydraulic steering system of claim 9, further comprising:
detection devices comprising:
i) a first sensor suitable to detect the rotation angle ($\alpha$) of the steering column; and
ii) a second sensor suitable to detect the effective steering angle of the wheels ($\beta$);
wherein the detection devices are connected to the electronic command unit in such a way that it commands actuation of the electric motor as a function of what is detected by the first sensor and the second sensor.

11. A tractor or a garden tractor comprising the hydraulic steering system of claim 9.

12. A tractor or a garden tractor comprising a driving cab in which a driver is housed, wherein the adjustment assembly of claim 1 is suitable to be housed in said driving cab.

* * * * *